United States Patent
Hahn et al.

(10) Patent No.: US 10,050,664 B1
(45) Date of Patent: Aug. 14, 2018

(54) ENHANCED LINEARITY MIXER

(71) Applicant: Kumu Networks, Inc., Sunnyvale, CA (US)

(72) Inventors: Wilhelm Steffen Hahn, Sunnyvale, CA (US); Alfred Riddle, Sunnyvale, CA (US); Ernie Landi, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/937,406

(22) Filed: Mar. 27, 2018

Related U.S. Application Data

(60) Provisional application No. 62/477,346, filed on Mar. 27, 2017, provisional application No. 62/598,739, filed on Dec. 14, 2017.

(51) Int. Cl.
  *H04B 1/26* (2006.01)
  *H04B 1/56* (2006.01)
  *H04L 5/14* (2006.01)

(52) U.S. Cl.
  CPC . *H04B 1/56* (2013.01); *H04L 5/14* (2013.01)

(58) Field of Classification Search
  CPC .... H03D 7/1433; H03D 7/1441; H03D 7/165; H03D 7/00; H03D 7/125; H03D 7/12; H03D 7/1408; H03D 7/14; H04B 1/26; H04B 1/28; H04B 1/56; H04L 5/14
  USPC ....... 455/313, 315, 318, 319, 323, 326, 333; 327/113, 356
  See application file for complete search history.

(56) References Cited

U.S. PATENT DOCUMENTS

| | | | | |
|---|---|---|---|---|
| 6,242,964 B1* | 6/2001 | Trask | ............... | H03D 7/1425 327/359 |
| 7,035,615 B2* | 4/2006 | Kim | ............... | H03D 7/1441 455/317 |
| 7,113,755 B2* | 9/2006 | Abdelli | ............... | H03D 7/1441 455/118 |
| 8,050,644 B1* | 11/2011 | Cosand | ............... | H03D 7/1441 455/295 |
| 2004/0242180 A1* | 12/2004 | Beach | ............... | H03D 7/163 455/323 |

* cited by examiner

*Primary Examiner* — Nhan Le
(74) *Attorney, Agent, or Firm* — Jeffrey Schox; Thomas Gwinn

(57) ABSTRACT

A system for enhanced linearity mixing includes an input-source signal coupler; a local oscillator (LO) signal coupler; a primary mixer that combines, via heterodyning, the primary-mixer-input signal and the primary-mixer-LO signal to generate a primary-mixer-output signal; a distortion-source mixer that combines, via heterodyning, the distortion-mixer-input signal and the distortion-mixer-LO signal to generate a distortion-mixer-output signal; and an output signal coupler that combines the primary-mixer-output signal and the distortion-mixer-output signal to generate an output signal with reduced non-linearity.

22 Claims, 7 Drawing Sheets

ENHANCED LINEARITY MIXER

CROSS-REFERENCE TO RELATED APPLICATIONS

This application claims the benefit of U.S. Provisional Application Ser. No. 62/477,346, filed on 27 Mar. 2017 and of U.S. Provisional Application Ser. No. 62/598,739, filed on 14 Dec. 2017, all of which are incorporated in their entireties by this reference.

TECHNICAL FIELD

This invention relates generally to the analog circuit field, and more specifically to new and useful systems and methods for enhanced linearity frequency mixing.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference.

Many solutions to address self-interference rely on mixing circuits (e.g., as part of an analog self-interference canceller), but these solutions may suffer in performance due to constraints inherent in traditional frequency mixers. Thus, there is a need in the wireless communications field to create new and useful systems and methods for enhanced linearity frequency mixing. This invention provides such new and useful systems and methods.

Of course, such systems and methods for enhanced linearity frequency mixing may find use in a wide variety of applications in analog circuits.

DESCRIPTION OF THE INVENTION EMBODIMENTS

Figure 1:
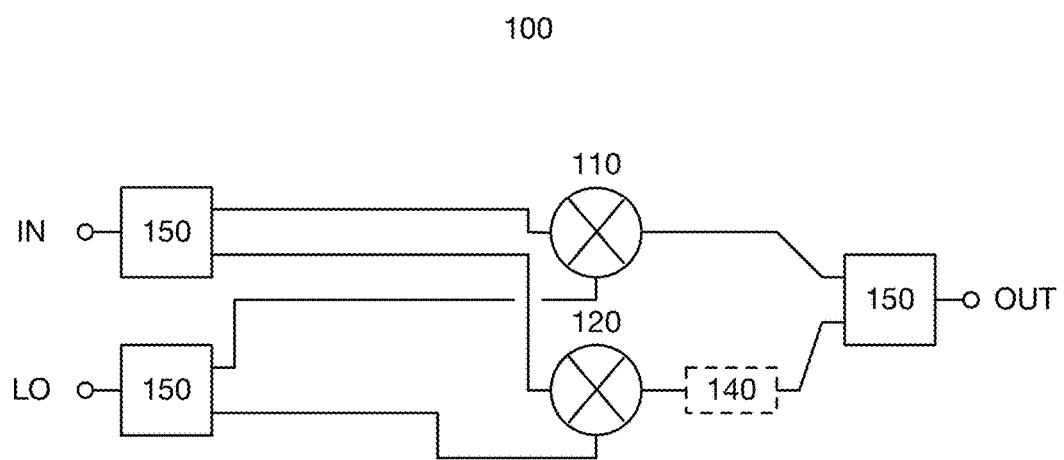
FIG. 1 is a diagram view of a system of an invention embodiment.

The following description of the invention embodiments of the invention is not intended to limit the invention to these invention embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals, intermediate frequency (IF) analog signals, or as radio-frequency (RF) analog signals, but full-duplex transceivers may additionally or alternatively sample transmission output in any suitable manner (e.g., as IF digital signals). This sampled transmission output may be used by full-duplex transceivers to remove interference from received wireless communications data (e.g., as RF/IF analog signals or baseband digital signals). In many full-duplex transceivers, an analog self-interference cancellation system is paired with a digital self-interference cancellation system. The analog self-interference cancellation system removes a first portion of self-interference by summing delayed, phase shifted and scaled versions of the RF transmit signal to create an RF self-interference cancellation signal, which is then subtracted from the RF receive signal. Alternatively, the analog cancellation system may perform similar tasks at an intermediate frequency. After the RF (or IF) receive signal has the RF/IF self-interference cancellation signal subtracted, it passes through an analog-to-digital converter of the receiver (and becomes a digital receive signal). After this stage, a digital self-interference cancellation signal (created by transforming a digital transmit signal) is then subtracted from the digital receive signal.

The systems and methods described herein may increase performance of full-duplex transceivers (and other applicable systems) by enabling high linearity frequency mixing without prohibitive increases in circuit complexity and/or cost. Other applicable systems include active sensing systems (e.g., RADAR), wired communications systems, wireless communications systems, channel emulators, reflectometers, PIM analyzers and/or any other systems featuring analog electronics, including communication systems where transmit and receive bands are close in frequency, but not overlapping.

2. System for Enhanced Linearity Mixing

A system 100 for enhanced linearity mixing includes a primary mixer 110, a distortion-source mixer 120, and signal couplers 150, as shown in FIG. 1. The system 100 may additionally include a phase shifter 130, a scaler 140, and/or harmonic shorting circuits 160.

The system 100 functions to improve the linearity of frequency mixers (or more generally, circuits and line-ups including frequency mixers). High linearity circuits are important for a large variety of analog electronic systems, particularly in communications systems. Traditionally, analog circuit designers can improve linearity by sourcing higher linearity components (which can incur significant cost), reducing power levels (which may have negative consequences for signal-to-noise levels or otherwise), or by substantially increasing circuit complexity and power consumption.

Operating on a general principle similar to the self-interference cancellation techniques discussed in Section 1, the system 100 utilizes components (e.g., the distortion-source mixer 120) to model and subtract distortion present in the output of the primary mixer 110 (or a more general circuit including the primary mixer 110), thus creating a more linear output of the system 100 than that of the primary mixer 110 alone.

The primary mixer 110 functions to convert an input signal from a first frequency to a second frequency; e.g., from radio frequency (RF) to intermediate frequency (IF) or baseband, or from baseband to RF or IF, or from IF to baseband or RF.

The primary mixer 110 is preferably an active mixer, but may additionally or alternatively be a passive mixer. The primary mixer 110 may comprise discrete components, analog integrated circuits (ICs), digital ICs, and/or any other suitable components. The primary mixer 110 preferably functions to combine two or more electrical input signals into one or more composite outputs, where each output includes some characteristics of at least two input signals.

The primary mixer 110 preferably takes in an input signal as well as a frequency shift signal, preferably provided by a local oscillator (LO). The local oscillator is preferably a PLL (Phase Locked Loop) steered digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

Given an input signal centered at frequency f1 and frequency shift signal at frequency f2, the primary mixer 110 may produce output signals (each a product of the input signal and the frequency shift signal) at each of the following frequencies: $f=nf_1+mf_2$, where n and m are integers. Take, for example, that f1 is 900 MHz, f2 is 750 MHz, and the desired output frequency is 150 MHz. In this example, the problematic outputs are those around 150 MHz, other from the primary output that is at $f_1-f_2$. In this example, the outputs other than the primary output that are near the desired frequency are at $\{\{n, m\}\}=\{\{-4,5\}, \{6,-7\}\}$ (which are, for most mixers, almost non-existent).

Unfortunately, the situation is more complicated when the primary mixer no encounters multiple closely spaced signals simultaneously (as is common in communications). Now assume two input signals at f1 and f2, and frequency shift at f3; now products can be produced at all $f=nf_1+mf_2+of_3$. Assuming now that f1 is 900.00 MHz, f2 is 900.050 MHz, f3 is 750 MHz, and the desired output frequencies are 150.000 and 150.050 MHz. Now, there are troubling outputs: $\{\{n, m, o\}\}=\{\{2,-1,-1\}, \{-1,2,-1\}\}$ (third order terms), $\{\{n, m, o\}\}=\{\{3,-2,-1\}, \{-2,3,-1\}\}$ (fifth order terms), and $\{\{n, m, o\}\}=\{\{4,-3,-1\}, \{-3,4,-1\}\}$ (seventh order terms). These outputs are as shown in FIG. 2.

Figure 2:
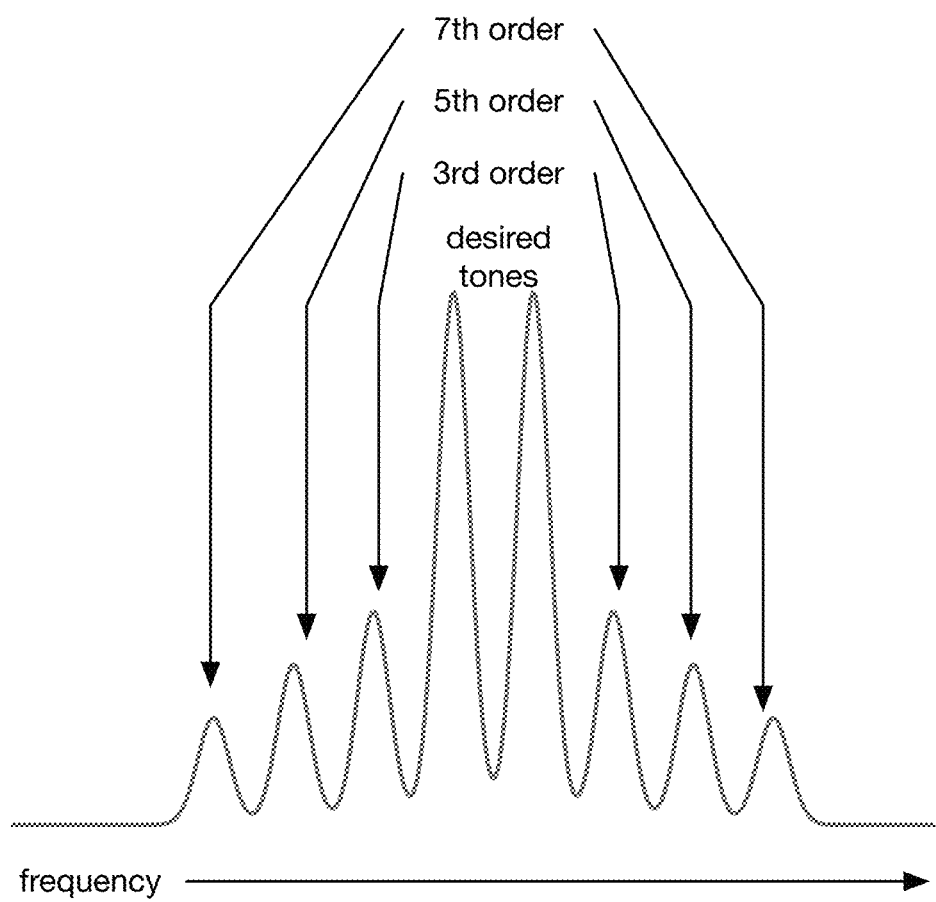
FIG. 2 is an example graph view of an output signal of a mixer.

The distortion-source mixer 120 functions to model the distortion of the primary mixer 110 (e.g., as shown in FIG. 2). This output of the distortion-source mixer 120 may then be subtracted from that of the primary mixer 110, reducing the distortion present in the output of the primary mixer 110.

The distortion present in the output of the primary mixer 110 is reduced because the signal power ratio of first order components to higher order components (i.e., components of order >1, also referred to as non-linear components) in the distortion mixer output is preferably higher than in the primary mixer output, so subtracting the distortion mixer output from the primary mixer output reduces higher order components more than it reduces first order components.

The distortion-source mixer 120 is preferably substantially similar to the primary mixer 110, but the distortion-source mixer 120 may be a mixer with different fundamental characteristics than the primary mixer 110 (alternatively, they may be the same).

Figure 3:
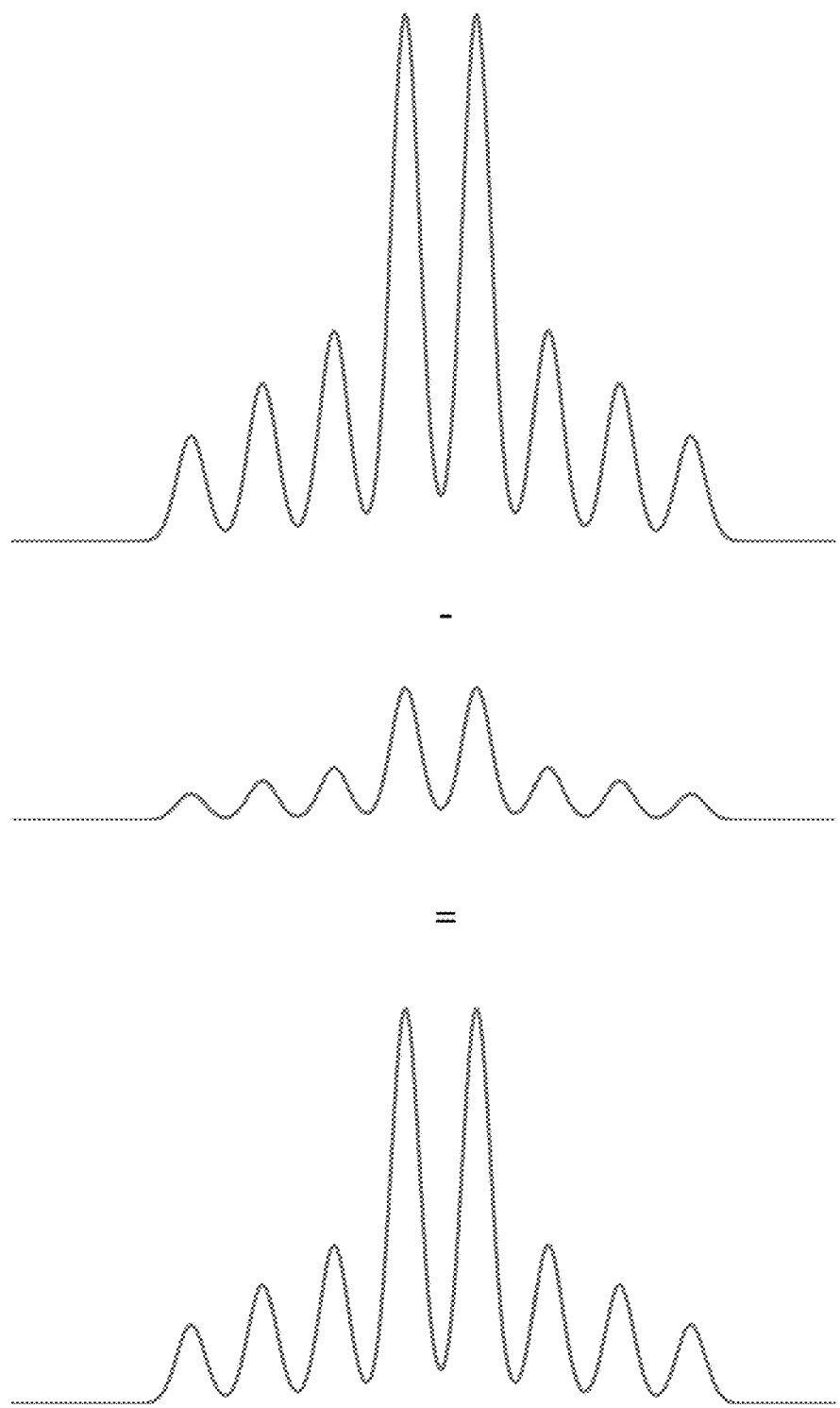
FIG. 3 is an example view of signal combination of a system of an invention embodiment.

In a first configuration, the primary mixer 110 and distortion-source mixer 120 have substantially identical configuration and characteristics (e.g., input-referred third-order intercept point (IIP3), conversion gain, noise floor, frequency response) and substantially identical input signals. In this embodiment, the output of the distortion-source mixer 120 may be attenuated relative to the primary mixer 110 (by the scaler 140) and inverted (by the phase shifter 130) and then combined with the output of the primary mixer 110. However, in this invention embodiment, any reduction in distortion in the primary mixer 110 is accompanied by an equal reduction in the desired signal as well, as shown in FIG. 3 (e.g., the desired signal and distortion are both reduced by 12 dB). This configuration is not desirable.

Figure 4:
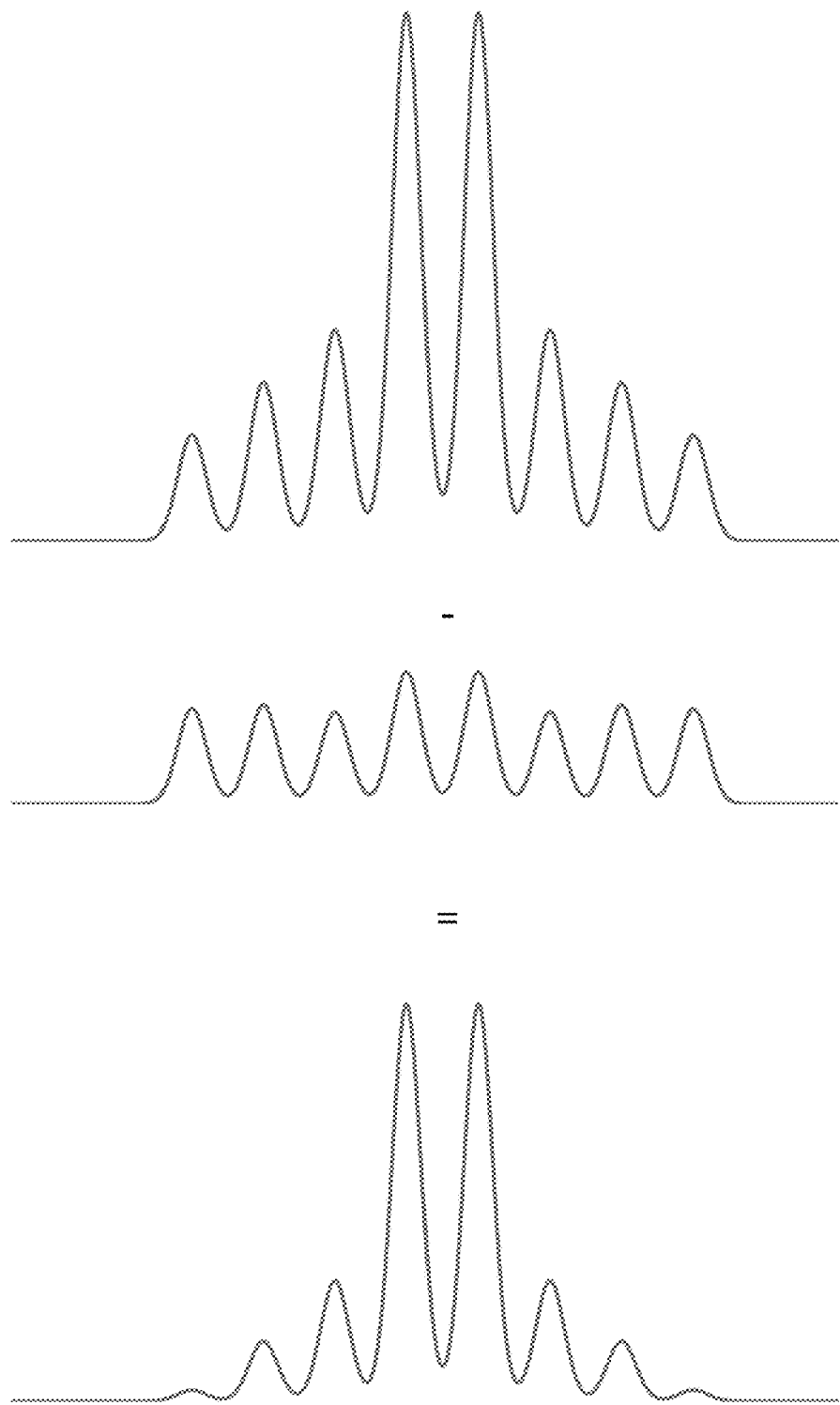
FIG. 4 is an example view of signal combination of a system of an invention embodiment.
Figure 5:
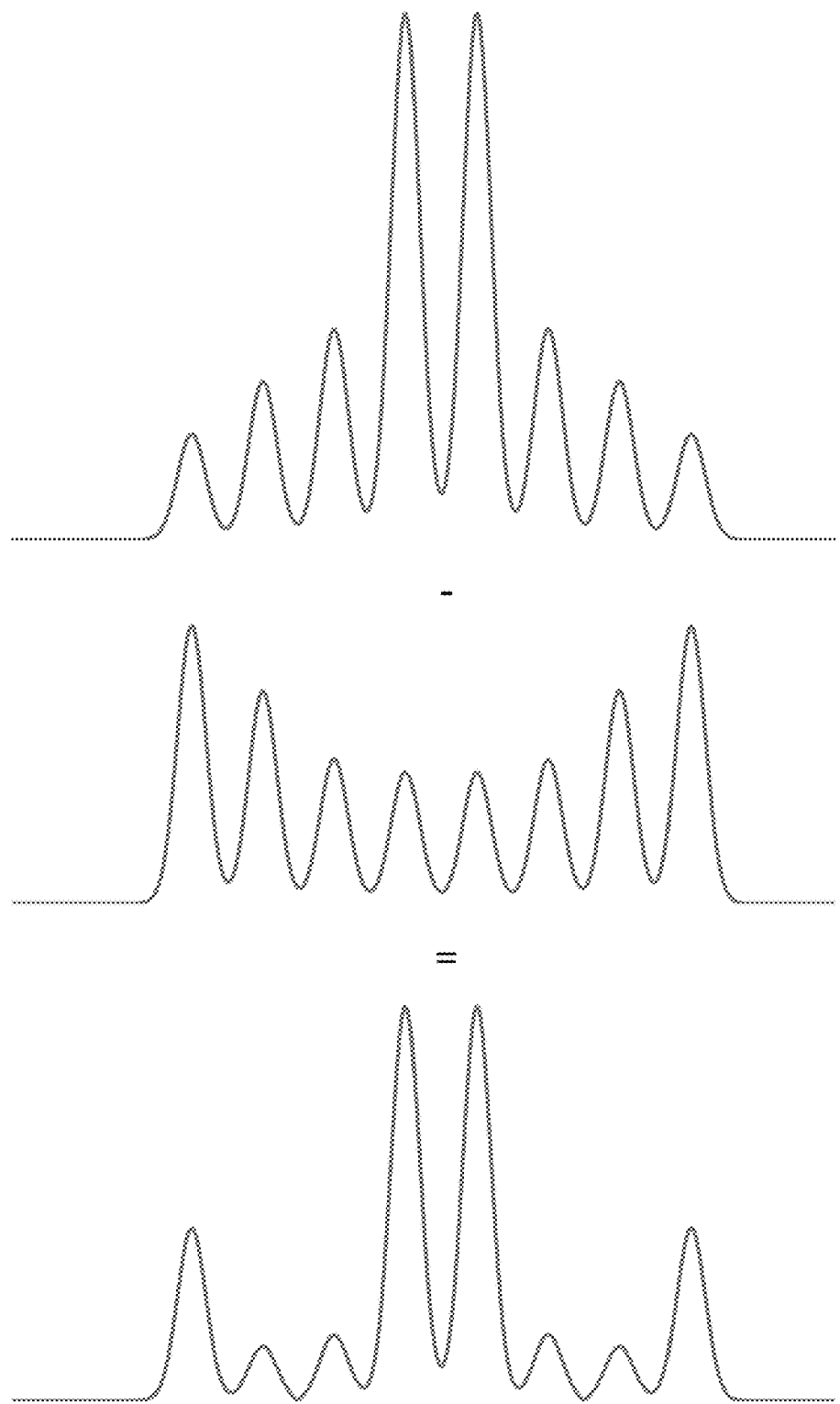
FIG. 5 is an example view of signal combination of a system of an invention embodiment.

In a second configuration, the primary mixer 110 and distortion-source mixer 120 have substantially identical characteristics (e.g., IIP3, conversion gain, noise floor, frequency response), but different input signals. In this configuration, the input signal to the distortion-source mixer 120 has a higher power than that of the primary mixer 110 (by some combination of splitting, attenuation, and/or gain). Because the third order intermodulation products roughly grow with input power to the third order (and so on for fifth and seventh order products), in this configuration, the increased input power means that the signal produced by the distortion-source mixer 120 is more non-linear than that of the primary mixer 110. The output of the distortion-source mixer 120 may then be attenuated (or the primary mixer 110 signal may be amplified) before subtraction. This may be a desirable configuration of the system 100. An example is as shown in FIG. 4. Note that this technique may possibly be limited by the higher order intermodulation products; that is, if the signal (gain) is increased enough on the distortion-source mixer 120 input, it may result in the addition of noise, as shown in FIG. 5.

Note that due to manufacturing variance, substantially similar characteristics may mean that the mixers share identical characteristic specifications (e.g., each characteristic parameter has an identical center value and identical error ranges) but are not actually identical (e.g., both mixers may have an insertion loss of 3 dB plus or minus 0.5 dB, meaning that one mixer could have an insertion loss of 3.1 dB while another has an insertion loss of 2.7 dB).

A variation of the second configuration is using identical input signals but different LO signal levels. When a lower LO level is used for the distortion-source mixer its non-linearity will increase and so will the intermodulation products. The result is similar to the plots shown in FIG. 4 (or FIG. 5).

Both methods described for the second configuration may be combined to optimize linearity, insertion loss, circuit complexity and noise figure.

Figure 6:
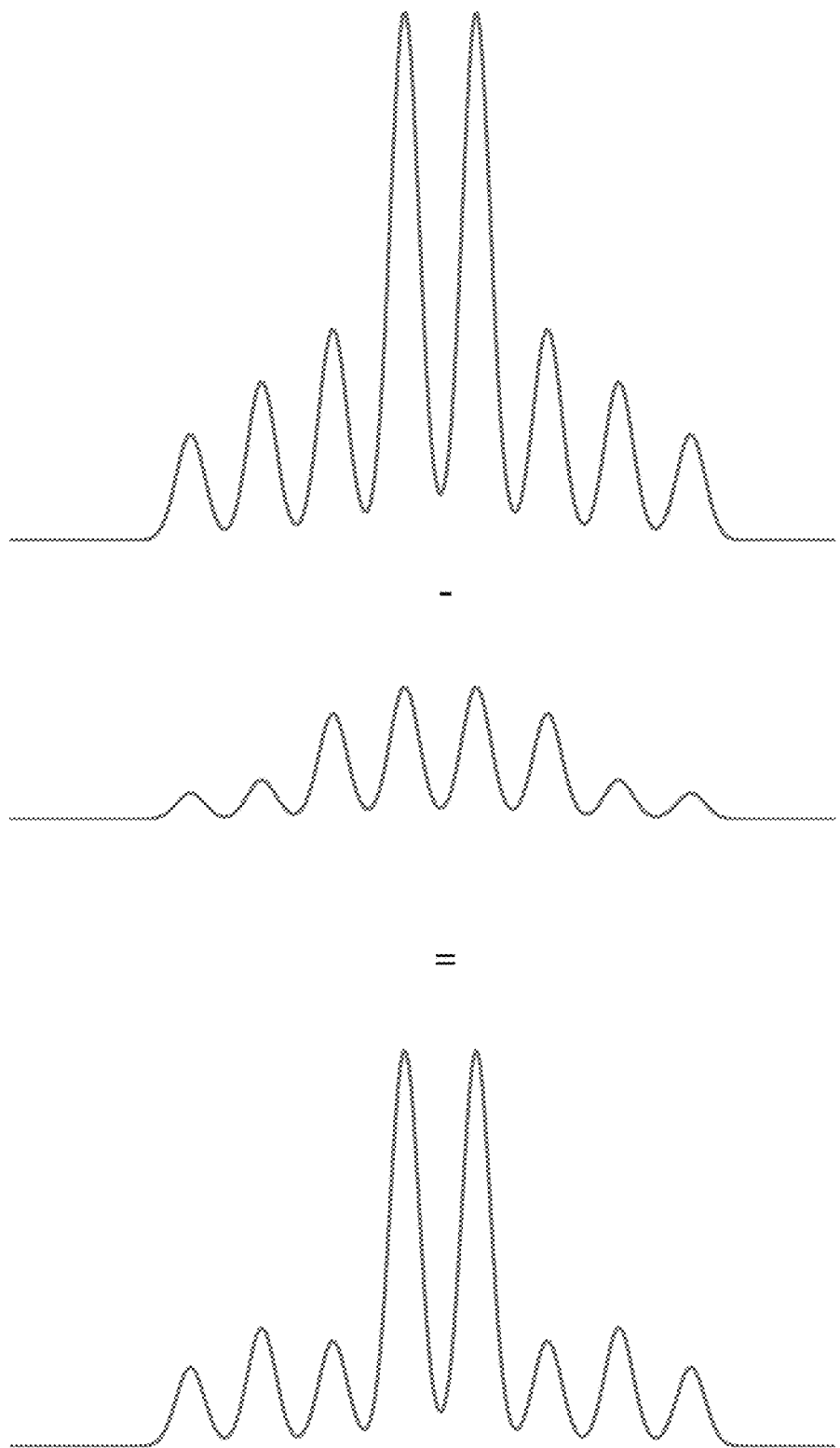
FIG. 6 is an example view of signal combination of a system of an invention embodiment.
Figure 7:
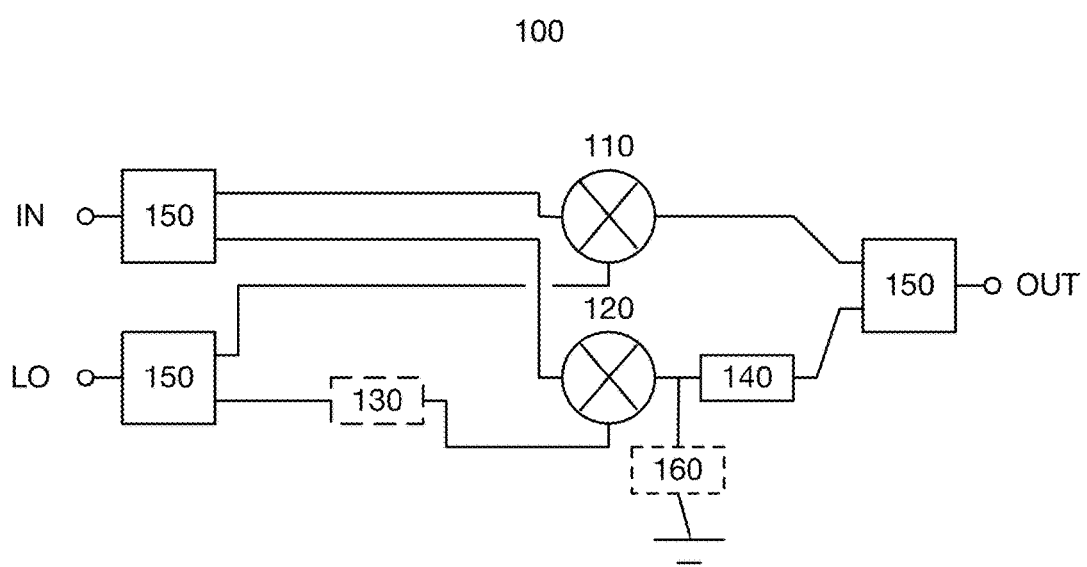
FIG. 7 is a diagram view of a system of an invention embodiment.

In a third configuration, the primary mixer 110 and distortion-source mixer 120 have non-identical configuration and/or characteristics (e.g., IIP3, conversion gain, noise floor, frequency response, operating mode), but substantially identical input signals. For example, the primary mixer 110 and distortion-source mixer 120 may have similar conversion gains and noise floors, but a different IIP3. In this example, the distortion-source mixer 120 preferably exhibits non-linearity similar in form but of a greater magnitude than of the primary mixer 110, allowing for similar effects to the second configuration, but without necessarily suffering the same limitations of the second configuration (e.g., requiring both higher power and a mixer to handle it). In fact, in some mixers, a "low-power" mode enables the mixer to operate at a lower operating power, but with lower IIP3; the system 100 may utilize a primary mixer 110 in "normal mode" and a distortion-source mixer 120 in "low-power" mode in such a scenario. This may be a desirable configuration of the system 100. An example is as shown in FIG. 6.

The system 100 may additionally or alternatively use both mixers 110/120 with non-identical characteristics, non-identical input signals and non-identical LO signals. Mixers 110/120 may be configured in any manner and are not limited to the examples given.

Note that as shown in FIG. 1, the primary mixer 110 and distortion-source mixer 120 share a local oscillator source; additionally or alternatively, the primary mixer 110 and distortion-source mixer 120 may utilize different local oscillator signals.

The phase shifter 130 preferably functions to shift the phase of one of the primary mixer 110 and distortion source mixer 120 such that the output of the distortion source mixer 120 is 180 degrees out of phase with the primary mixer 110 before addition of the signals. Alternatively, the phase shifter 130 may be used for any phase shifting purpose.

The phase shifter 130 may include an impedance matching network at its input and output that compensates for variations in the phase shifter 130 input and output impedance (and/or phase shift amount) due to changes in signal component frequency or simply transforms the impedance to and from a suitable impedance level for the core of the phase shifter to a standardized impedance level (50 ohms). Alternatively, the phase shifter 130 may not include impedance matching networks. The impedance matching networks are preferably tunable (e.g., continuously or discretely variable) but may additionally or alternatively be static (i.e., the impedance transformation achieved by using the network is not variable).

The phase shifter 130 is preferably separated into a set of phase shifting stages. These phase shifting stages preferably may be switched 'on' (e.g., in signal path) or 'off' (e.g., bypassed, out of signal path), depending on control signals. The resulting phase shift is determined by which stages are on and which stages are off; for example, a phase shifter 130 with a 90-degree phase shifting stage and a 10-degree phase shifting stage 'on' might cause a shift of 100 degrees in signal phase.

Each phase shifting stage preferably causes a set amount (i.e., non-variable amount) of phase shift. Alternatively, phase shifting stages may include tunable phase-shift elements. For example, a phase shifting stage may include a varactor; by changing a control voltage of the varactor, the varactor's capacitance (and thus the amount of phase shift experienced by a signal passing through the stage) may be varied.

The phase shifters 130 are preferably controlled by a tuning circuit, but may additionally or alternatively be controlled in any suitable manner.

Note that phase shifters 130 may be located at any point in the system 100; e.g., between the LO and the primary mixer 110 input on the LO signal; between the LO and the distortion-source mixer 120 input on the LO signal; between the system input and the primary mixer 110 input on the input signal; between the system input and the distortion-source mixer 120 input on the input signal; between the primary mixer 110 output and the system output; and/or between the distortion-source mixer 120 output and the system output.

The scaler 140 functions to scale transmit signal components; specifically, the scalers 140 effectively multiply the transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. Scale factors may be complex; for example, a scale factor of $e^{\frac{i\pi}{2}}$ might be represented as a phase shift of ninety degrees.

The scalers 140 may include attenuators, amplifiers, phase inverters, and/or any other suitable components for scaling analog signal components. Attenuators may be resistive attenuators (T pad, Pi pad), amplifiers with less than unity gain, or any other suitable type of attenuator. Amplifiers may be transistor amplifiers, vacuum tube amplifiers, op-amps, or any other suitable type of amplifier. Phase inverters may be any phase inversion devices, including NPN/PNP phase inversion circuits, transformers and/or inverting amplifiers.

The scalers 140 preferably are capable of attenuation, gain, and phase inversion, but may alternatively be capable only of a subset of said capabilities. Each scaler 140 preferably includes all three capabilities in a single device (e.g., an amplifier with tunable gain and two outputs, one inverted and one non-inverted) but may additionally or alternatively separate capabilities into different sections (e.g., an amplifier with tunable gain but no inversion capability, along with a separate phase inversion circuit, an attenuator). The scalers 140 are preferably controlled by a tuning circuit, but may additionally or alternatively be controlled in any suitable manner.

Similarly to phase shifters 130, scalers 140 may be located at any point in the circuit. For example, as shown in FIG. 1, an attenuating scaler 140 may be used to attenuate the output of the distortion-source mixer 120. Additionally or alternatively, an amplifying scaler 140 could be used to amplify the output of the primary mixer 110.

Note that in some cases functionality (e.g., in phase inversion) may be accomplished by either or both of the phase shifter 130 and the scaler 140.

Signal couplers 150 function to allow analog signals to be split and/or combined. Signal couplers 150 may couple and/or split signals using varying amounts of power; for example, a signal coupler 150 intended to sample a signal may have an input port, an output port, and a sample port, and the coupler 150 may route the majority of power from the input port to the output port with a small amount coming from the sample port (e.g., a 99.9%/0.1% power split between the output and sample port, or any other suitable split).

The signal coupler 150 is preferably a short section directional transmission line coupler, but may additionally or alternatively be any power divider, power combiner, directional coupler, or other type of signal splitter. The signal coupler 150 is preferably a passive coupler, but may additionally or alternatively be an active coupler (for instance, including gain blocks and power amplifiers). For example, the signal coupler 150 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler.

For example, a signal coupler 150 may split an input-source signal (the input to the system 100) into two input signals, one of which will serve as input to the primary mixer 110 (primary-mixer-input signal) and one of which will serve as input to the distortion-source mixer 120 (distortion-mixer-input signal). Likewise, another signal coupler 150 may split a local oscillator signal into two signals, one of which will serve as the LO signal for the primary mixer 110 (primary-mixer-LO signal) and one of which will serve as the LO signal to the distortion-source mixer 120 (distortion-mixer-LO signal).

Harmonic shorting circuits 160 function to reduce the contribution of harmonics to the output of the system 100 (and thus function to increase linearity of the output). Harmonic shorting circuits are preferably series LC resonators tuned to resonance at a specific harmonic frequency (e.g., 3f, 5f), but may additionally or alternatively be any circuit capable of shorting a signal path of the system 100 at a specific desired frequency. Similar to phase shifters 130 and scalers 140, harmonic shorting circuits 160 may be placed at any point in the system 100. For example, a third harmonic short may be placed in the output path of the distortion-source mixer 120 (which reduces the presence of fifth-order intermodulation (IM5) and/or seventh-order intermodulation (IM7) products in the output of the distortion source mixer 120 and prevents a growth of these components after subtraction as shown in FIG. 5). A harmonic shorting circuit 160 may additionally or alternatively be placed at the input or output of the primary mixer 110, at the output of the distortion-source mixer 120, or at any other location. Note that multiple harmonic shorting circuits 160 may be placed in parallel (or otherwise may be located in the system 100) to reduce the presence of harmonics at multiple frequencies.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for enhanced linearity mixing. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for enhanced linearity mixing comprising:
an input-source signal coupler that splits a first input signal into a primary-mixer-input signal and a distortion-mixer-input signal;
a local oscillator (LO) signal coupler that splits a first LO signal into a primary-mixer-LO signal and a distortion-mixer-LO signal;
a primary mixer that combines, via heterodyning, the primary-mixer-input signal and the primary-mixer-LO signal to generate a primary-mixer-output signal that comprises a first-order primary-mixer-output signal component and a higher-order primary-mixer-output signal component; wherein the primary-mixer-output signal is characterized by a first signal power ratio of the higher-order primary-mixer-output signal component to the first-order primary-mixer-output signal component;
a distortion-source mixer that combines, via heterodyning, the distortion-mixer-input signal and the distortion-mixer-LO signal to generate a distortion-mixer-output signal that comprises a first-order distortion-mixer-output signal component and a higher-order distortion-mixer-output signal component; wherein the distortion-mixer-output signal is characterized by a second signal power ratio of the higher-order distortion-mixer-output signal component to the first-order distortion-mixer-output signal component; wherein the second signal power ratio is greater than the first signal power ratio; and
an output signal coupler that combines the primary-mixer-output signal and the distortion-mixer-output signal to generate an output signal that comprises a first-order output signal component and a higher-order output signal component; wherein the output signal is characterized by a third signal power ratio of the higher-order output signal component to the first-order output signal component; wherein the third signal power ratio is lesser than the first signal power ratio and lesser than the second signal power ratio.

2. The system of claim 1, further comprising a phase shifter; wherein the phase shifter inverts one of the primary-mixer-input signal, the distortion-mixer-input-signal, the primary-mixer-LO signal, and the distortion-mixer-LO signal; wherein inversion results in the primary-mixer-output signal being inverted relative to the distortion-mixer-output signal at the output signal coupler.

3. The system of claim 2, wherein the phase shifter inverts the primary-mixer-input signal.

4. The system of claim 2, wherein the phase shifter inverts the primary-mixer-LO signal.

5. The system of claim 2, wherein the phase shifter inverts the distortion-mixer-input signal.

6. The system of claim 2, wherein the phase shifter inverts the distortion-mixer-LO signal.

7. The system of claim 1, wherein the higher-order signal components are third-order intermodulation products.

8. The system of claim 1, wherein the higher-order signal components are fifth-order intermodulation products.

9. The system of claim 1, wherein the distortion-source mixer and primary mixer have identical characteristic specifications.

10. The system of claim 9, wherein the distortion-mixer-input signal has higher signal power than the primary-mixerinput signal, resulting in the distortion-mixer-output signal having higher non-linearity than the primary-mixer-output signal.

11. The system of claim 10, further comprising a first scaler that either attenuates the primary-mixer-input signal or amplifies the distortion-mixer-input signal.

12. The system of claim 11, further comprising a second scaler that either attenuates the distortion-mixer-output signal or amplifies the primary-mixer-output signal, such that the first-order primary-mixer-output signal component is higher power than the first-order distortion-mixer-output signal component.

13. The system of claim 9, wherein the distortion-mixer-LO signal has lower signal power than the primary-mixer-LO signal, resulting in the distortion-mixer-output signal having higher non-linearity than the primary-mixer-output signal.

14. The system of claim 10, further comprising a first scaler that either amplifies the primary-mixer-LO signal or attenuates the distortion-mixer-LO signal.

15. The system of claim 11, further comprising a second scaler that either attenuates the distortion-mixer-output signal or amplifies the primary-mixer-output signal, such that the first-order primary-mixer-output signal component is higher power than the first-order distortion-mixer-output signal component.

16. The system of claim 9, wherein the distortion-source mixer is operating in a different operating mode than the primary mixer, resulting in the distortion-mixer-output signal having higher non-linearity than the primary-mixer-output signal.

17. The system of claim 16, wherein the distortion-source mixer is operating in a low-power mode.

18. The system of claim 8, wherein the distortion-source mixer and primary mixer have non-identical characteristic specifications.

19. The system of claim 18, wherein the distortion-source mixer and primary mixer have different input-referred third-order intercept point (IIP3) values.

20. The system of claim 1, further comprising a harmonic shorting circuit coupled to an output of the distortion-source mixer that reduces at least one of fifth-order intermodulation (IM5) products and seventh-order intermodulation (IM7) products in the distortion-mixer-output signal.

21. The system of claim 20, wherein the harmonic shorting circuit comprises at least one LC resonator tuned to a fifth-order harmonic frequency.

22. The system of claim 21, wherein the harmonic shorting circuit comprises at least one LC resonator tuned to a seventh-order harmonic frequency.

\* \* \* \* \*